(12) United States Patent
Nenner et al.

(10) Patent No.: US 8,792,424 B2
(45) Date of Patent: Jul. 29, 2014

(54) INTERWORKING FUNCTION BETWEEN AN INTELLIGENT NETWORK AND A HOME LOCATION REGISTER/HOME SUBSCRIBER SERVER

(75) Inventors: Karl Heinz Nenner, Bornheim (DE); Dieter Jacobsohn, Bonn (DE)

(73) Assignee: Deutsche Telekom AG, Bonn (DE)

( * ) Notice: Subject to any disclaimer, the term of this patent is extended or adjusted under 35 U.S.C. 154(b) by 65 days.

(21) Appl. No.: 13/577,285

(22) PCT Filed: Feb. 4, 2011

(86) PCT No.: PCT/EP2011/000517
§ 371 (c)(1),
(2), (4) Date: Oct. 10, 2012

(87) PCT Pub. No.: WO2011/095343
PCT Pub. Date: Aug. 11, 2011

(65) Prior Publication Data
US 2013/0034055 A1    Feb. 7, 2013

Related U.S. Application Data

(60) Provisional application No. 61/301,897, filed on Feb. 5, 2010.

(30) Foreign Application Priority Data

Feb. 5, 2010 (EP) ...................................... 10001207

(51) Int. Cl.
*H04W 4/00* (2009.01)
*H04W 8/04* (2009.01)
(52) U.S. Cl.
CPC ...................................... *H04W 8/04* (2013.01)
USPC .......................................... 370/328; 370/254

(58) Field of Classification Search
CPC ........... H04W 8/02; H04W 8/04; H04W 8/08; H04W 8/10; H04W 8/12; H04W 8/14
USPC .......................................................... 370/328
See application file for complete search history.

(56) References Cited

U.S. PATENT DOCUMENTS

| | | | |
|---|---|---|---|
| 2010/0029248 A1* | 2/2010 | Shi et al. | 455/411 |
| 2010/0195613 A1* | 8/2010 | Hu et al. | 370/329 |
| 2010/0217821 A1* | 8/2010 | Grayson et al. | 709/206 |

(Continued)

FOREIGN PATENT DOCUMENTS

| | | |
|---|---|---|
| CN | 101252777 A | 8/2008 |
| EP | 1860837 A1 | 11/2007 |
| WO | WO 2009059519 A1 | 5/2009 |

OTHER PUBLICATIONS

Nokia, Solutions for EPS interworking with a pre-Rel-8 HSS/HLR, 3GPP Draft; S3a071031-preR8-HLR-disc, 20071213 3rd Generation Partnership Project (3GPP), Mobile Competence Centre ; 650, route des Lucioles ; F-06921 Sophia-Antipolis Cedex; France, p. 1-10, Dec. 2007.

(Continued)

*Primary Examiner* — Gary Mui
(74) *Attorney, Agent, or Firm* — Leydig, Voit & Mayer, Ltd.

(57) ABSTRACT

A Core Network for data transmission in an Evolved Packet System (EPS) includes: one or more node(s) serving as a Home Location Register (HLR) according to a GSM/UMTS mobile communication network standard; a node serving as a Home Subscriber Server (HSS) according to 3GPP standards; and an Interworking Function (IWF) for the handling of messages exchanged between a signalling layer of the Core Network and the one or more node(s) serving as the Home Location Register (HLR) as well as the node serving as the Home Subscriber Server (HSS). The Core Network is arranged such that for an exchange of information between the signalling layer and the Interworking Function (IWF), an Intelligent Network (IN) or an Advanced Intelligent Network (AIN) is used.

19 Claims, 2 Drawing Sheets

(56) References Cited

U.S. PATENT DOCUMENTS

2011/0280155 A1* 11/2011 Shi ............................... 370/254
2011/0280254 A1* 11/2011 Shi ............................... 370/401

OTHER PUBLICATIONS

European Patent Office, International Search Report in International Patent Application No. PCT/EP2011/000517 (Apr. 19, 2011).

* cited by examiner

INTERWORKING FUNCTION BETWEEN AN INTELLIGENT NETWORK AND A HOME LOCATION REGISTER/HOME SUBSCRIBER SERVER

CROSS-REFERENCE TO RELATED APPLICATIONS

This patent application is a national stage entry under 35 U.S.C. §371 of International Application No. PCT/EP2011/000517, filed Feb. 4, 2011, and claims priority to European Patent Application No. EP 10001207.9, filed Feb. 5, 2010, and U.S. Provisional Patent Application No. 61/301,897, filed Feb. 5, 2010. The International Application was published in English on Aug. 11, 2011, as WO 2011/095343 A1.

FIELD

The present invention relates a Core. Network for data transmission in an Evolved Packet System (EPS), the Core Network comprising a node serving as a Home Location Register (HLR) according to 3GPP standards, the Core Network further comprising a node serving as a Home Subscriber Server (HSS) according to the 3GPP standards. The present invention further relates to a method for data transmission in an Evolved Packet System (EPS), a Node for providing an Interworking Function (IWF) for data transmission in a Core Network of an Evolved Packet System (EPS), a Node serving as the Home Subscriber Server (HSS) according to the 3GPP standards for data transmission in a Core Network of an Evolved Packet System (EPS), and a program comprising a computer readable program code.

BACKGROUND

The Intelligent Network (IN) is able to generate and implement various new services in a fast, convenient, flexible, inexpensive and effective way. The objective of the IN is to serve all types of communication networks, including existing fixed communication networks such as a Public Switched Telephone Network (PSTN) and an Integrated Services Digital Network (ISDN) as well as mobile communication networks such as a Global System for Mobile Communication (GSM), a Universal Mobile Telecommunications System (UMTS), a north America Code Division Multiple Access (CDMA) system and a CDMA2000 system.

A characteristic of cellular communication systems is that, in principle, subscribers may use any cell of the system at any time, depending on their location when they use the cellular system. Hence, in contrast to fixed networks, the location of the subscriber cannot be deduced from the calling line.

However, cellular operators want to offer services where the tariffs are dependent on the subscriber's location. An example of such a service offering may be a "home service" (e.g. T-Mobile@home), where different tariffs are applied depending on whether customers access the cellular system through their "home cell(s)", or through another cell of the cellular system. Furthermore, a service could be realized such that the subscriber may only use the network in his/her "home cell(s)" but not in any other cell of the network, the home cell(s) being defined as the cell(s) that provide coverage in a specific area, e.g. the subscriber's home.

Typically, the subscriber's current location in the network is known on an "area" granularity (e.g. Location Area in GSM telephony) when the mobile device is idle, and on a "serving cell" granularity when the mobile device is active. This applies to both the circuit switched and the packet switched domains of the cellular system.

In existing cellular systems, the service logic to implement the differentiation of tariff, or network access permission, based on the subscriber's serving cell resides in a "service layer" "above" the network layer. Typically, Intelligent Network (IN) technology and systems are employed. For GSM and UMTS systems as standardized by 3GPP, the Intelligent Network (IN) can request the subscriber's location from the network. This is done by the Intelligent Network (IN) system sending a location query to the HLR, which in turn requests the subscriber's current cell from the serving Mobile Switching Center/Visitor Location Register (MSC/VLR). Methods how the Intelligent Network (IN) determines the Home Location Register (HLR) from the subscriber's ID (e.g. the telephone number, International Mobile Subscriber Identification (IMSI) or another identity information) are state of the art today, and the subscriber's serving Mobile Switching Center/Visitor Location Register (MSC/VLR) is known to the Home Location Register (HLR) as described in the respective standards.

If, when receiving the location query from the Home Location Register (HLR), the Mobile Switching Center/Visitor Location Register (MSC/VLR) knows only the Location Area (LA) of the subscriber, it performs a "Paging" of the mobile device in all the cells of the LA so that the serving cell can be determined when the mobile device responds to the paging. This type of paging is not signaled on the mobile's Man Machine Interface (MMI), so that the subscribers are not alerted/disturbed by the paging process. Once the Mobile Switching Center/Visitor Location Register (MSC/VLR) has determined the subscriber's serving cell, it returns the cell ID to the Home Location Register (HLR) which in turn sends it back to the Intelligent Network (IN) for further service processing. This technique of the Intelligent Network (IN) retrieving the subscriber's serving cell ID is commonly known as "any-time interrogation" (ATI).

Operators are currently in the process of adding more access technologies to their cellular networks, specifically the e-UTRAN (also known as LTE) as specified by 3GPP. The resulting overall network is called the "Evolved Packet System" (EPS).

With the addition of further components to the cellular system beyond the GSM/GPRS/UMTS circuit and packet switched domains, the notion of the HLR was replaced by the concept of a "Home Subscriber Server" (HSS). The Home Subscriber Server (HSS) logically encompasses the legacy Home Location Register (HLR) and all other network related subscriber information, e.g. for the IMS. There is no standard, or even common idea, how the Home Subscriber Server (HSS) is physically implemented—in some cases, existing Home Location Registers (HLRs) are upgraded, in others a completely new node is deployed. In other cases, actual implementations physically separate the data storage (e.g. a common data base) of the HLR from the communication "frontend", in which case the Home Location Register (HLR) frontend may be upgraded to include the Home Subscriber Server (HSS), or there may be a separate Home Subscriber Server (HSS) frontend.

In the Evolved Packet System (EPS), a new Mobility Management Entity (MME) performs equivalent mobility management functions to those of the MSC/Visitor Location Register (VLR) in the legacy circuit switched networks. However, the Mobility Management Entity (MME) communicates with the Home Subscriber Server (HSS), not with the Home Location Register (HLR)

uses a different protocol towards the Home Subscriber Server (HSS) than legacy nodes towards the Home Location Register (HLR)

employs a different set of subscriber data.

This implies that enhancements are needed beyond the existing HLRs, or databases and their frontends, in order to perform the new functions via new protocols.

SUMMARY

In an embodiment, the present invention provides a Core Network for data transmission in an Evolved Packet System (EPS). The Core Network includes: one or more node(s) serving as a Home Location Register (HLR) according to a GSM/UMTS mobile communication network standard; a node serving as a Home Subscriber Server (HSS) according to 3GPP standards; and an Interworking Function (IWF) for the handling of messages exchanged between a signalling layer of the Core Network and the one or more node(s) serving as the Home Location Register (HLR) as well as the node serving as the Home Subscriber Server (HSS). The Core Network is arranged such that for an exchange of information between the signalling layer and the Interworking Function (IWF), an Intelligent Network (IN) or an Advanced Intelligent Network (AIN) is used. The Interworking Function (IWF) is arranged such that, in view of a specific request from the signalling layer regarding a specific User Equipment (UE). The specific User Equipment (UE) is related or potentially related to a plurality of nodes serving as at least one of the Home Location Register or the Home Subscriber Server (HSS). The specific request is multiplied by the Interworking Function (IWF) and sent to the plurality of nodes serving as at least one of the Home Location Register or the Home Subscriber Server (HSS). Responses of the plurality of nodes serving as at least one of the Home Location Register or the Home Subscriber Server (HSS) are consolidated and the specific request answered to the signalling layer by a feedback communication.

DETAILED DESCRIPTION

Figure 1:
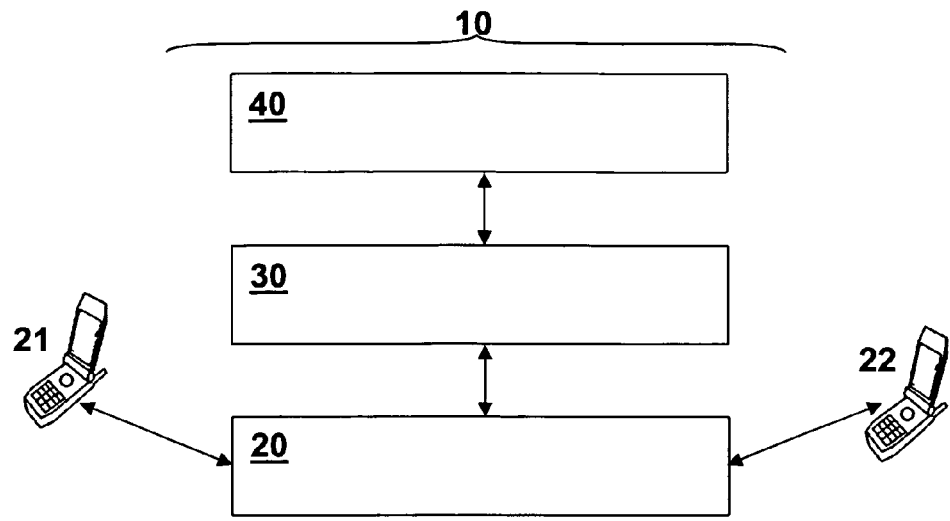
FIG. 1 schematically illustrates a Core Network for data transmission in an Evolved Packet System (EPS).

In an embodiment, the present invention provides a Core Network for data transmission in an Evolved Packet System (EPS), wherein the Core Network comprises one or more node(s) serving as a Home Location Register (HLR) and one or more node(s) serving as a Home Subscriber Server (HSS) and wherein a standard and uniform data transmission and/or data requesting functionality regarding User Equipment (UE) related data can be used, especially for the exchange and/or for requesting location information about the location of the User Equipment (UE). In a further embodiment, the present invention provides a method for data transmission in such an Evolved Packet System (EPS), an Interworking Function (IWF), one or more Node(s) serving as the Home Subscriber Server (HSS), and a program comprising a computer readable program code, allowing the standard data transmission functionality regarding User Equipment (UE) related data.

In an embodiment, the present invention provides a Core Network for data transmission in an Evolved Packet System (EPS), the Core Network comprising one or more node(s) serving as a Home Location Register (HLR) according to a GSM/UMTS standard, the Core Network further comprising one or more node(s) serving as a Home Subscriber Server (HSS) according to the 3GPP standards, and the Core Network further comprising an Interworking Function (IWF) for the handling of messages exchanged between a signalling layer of the Core Network on the one hand and the node(s) serving as the Home Location Register (HLR) as well as the node(s) serving as the Home Subscriber Server (HSS) on the other hand, wherein the interface between the signalling layer and the Interworking Function (IWF) is an Intelligent Network (IN) or an Advanced Intelligent Network (AIN).

According to the present invention, it is thereby advantageously possible that a complete reutilisation of existing interfaces, especially the interface of the Home Location Register (HLR) with the Intelligent Network (IN), is possible. All functionality related to the interaction of the Intelligent Network (IN) with either the Home Location Register (HLR) or the Home Subscriber Server (HSS) is made available by the Interworking Function (IWF). In the context of the present invention, the wording "wherein the interface between the signalling layer and the Interworking Function (IWF) is an Intelligent Network (IN) or an Advanced Intelligent Network (AIN)" means that the Core Network (or a node for providing an Interworking Function (IWF)) is arranged such that for an exchange of information between the signalling layer on the one hand, and the Interworking Function (IWF) on the other hand, an Intelligent Network (IN) or an Advanced Intelligent Network (AIN) is used.

In the following, the invention is mainly described only for the CS domain (circuit switched domain) but an application to the PS domain of the cellular system (packet switched domain) is equally possible, e.g. using Routing Areas instead of Location Areas, and Serving GPRS Support Node (SGSN) instead of Mobile Switching Center/Visitor Location Register (MSC/VLR).

Historically, the Home Location Register (HLR) has been specified as the network's subscriber data base, where each Home Location Register (HLR) stores subscriber records for a subset of the network's subscribers. Typical Home Location Register (HLR) implementations were "monolithic" in a sense that a single node provided both the database and the communication with other network nodes, e.g. the Mobile Switching Centers/Visitor Location Registers (MSC/VLRs). In more modern implementations, there is only a common (possibly distributed) database, which is accessed by "frontends" (e.g. a Home Location Register (HLR) frontend) that handle the communication with other network nodes. In implementations where each frontend can access every subscriber record in the database, and can talk to the plurality of all other nodes (e.g. to all Mobile Switching Centers/Visitor Location Registers (MSC/VLRs) in the network), it is not necessary to perform the Home Location Register (HLR) derivation mentioned above—the Intelligent Network (IN) can send its request to just any of the Home Location Register (HLR) frontends. Therefore according to the present invention, a node serving as the Home Location Register (HLR) can especially be a so-called Home Location Register (HLR) frontend. This means that the functions of the Home Location Register (HLR) are provided by such a frontend but the related database or databases is either physically or logically comprised in another node of the Core Network. Likewise, a node serving as the Home Subscriber Server (HSS) can especially be a so-called Home Subscriber Server (HSS) frontend. This means that the functions of the Home Subscriber Server (HSS) are provided by such a frontend but the related database or databases is either physically or logically comprised in another node of the Core Network. Especially, it is possible that both a Home Location Register (HLR) frontend and a Home Subscriber Server (HSS) frontend share at least partly the same database or databases within the network. In the following description the terms "node serving as a HLR (or HSS)" and "HLR (or HSS) frontend" are used synonymously. In the context of the present invention, mainly the "common database with frontends" network design is used, but it equally applies to monolithic Home Location Registers (HLRs), i.e. nodes serving as a (or the) Home Location Register (HLR). The invention relates to all embodiments of Home Location Registers (HLRs)/Home Subscriber Servers (HSSs).

The introduction of the Home Subscriber Server (HSS) in the Core Network can be done by upgrading existing Home Location Register (HLR) nodes, or by deploying new nodes, or by even a mixture of both approaches in frontends and databases. With the introduction of additional databases (or additional data in existing databases) and/or different frontends for the databases the problem occurs that the subscriber may be registered in different databases, or be located in parts of the cellular system that are reachable by different front ends only (i.e. for example a subscriber (or User Equipment (UE)) related information is accessible via the Home Subscriber Server (HSS) node or frontend but not via the existing Home Location Register (HLR) node or frontend). However, the Intelligent Network (IN) system has no knowledge about the currently used database or frontend and cannot therefore address the responsible entity. In addition, the existing interface for the Intelligent Network (IN) to the Home Location Register (HLR) has not been specified for the Home Subscriber Server (HSS), so that the Intelligent Network (IN) system isn't even physically able to talk to a new Home Subscriber Server (HSS) frontend.

According to the present invention, an interworking function (IWF) is added. In the context of the present invention, the terms "node providing an interworking Function (IWF)" or also "Interworking Function (IWF) frontend" are used to designate a unit or part of an integrated unit (e.g. integrated into a unit or node serving as a Home Location Register (HLR) and/or a Home Subscriber Server (HSS)) having an additional functionality, namely protocol conversion between the Intelligent Network (IN) system (as part of a signalling layer) on the one hand and (Home Location Register (HLR)/Home Subscriber Server (HSS) related) databases and frontends on the other hand, and the creation of multiple requests towards the databases or frontends from existing Intelligent Network (IN) system actions (i.e. in case the Intelligent Network (IN) requests a specific User Equipment (UE) related information or data and more than one frontend/database could be involved for retrieving such information or data, then the Interworking Function (IWF) sends requests to such frontends/databases and, in the feedback communication to the Intelligent Network (IN), consolidates the results obtained).

As a result according to the present invention, the Intelligent Network (IN) system communicates with this Interworking Function (IWF) as if it were a Home Location Register (HLR) frontend (so that no changes are needed in the Intelligent Network (IN) system). The Home Location Register (HLR) frontend talks to the Interworking Function (IWF) as if it were an Intelligent Network (IN) system. The Interworking Function (IWF) according to the present invention is also able to communicate with the Home Subscriber Server (HSS) frontend.

According to a preferred embodiment of the present invention, the signalling layer is a Signalling System #7 (SS7) protocol. According to the present invention, it is thereby advantageously possible to use a robust and reliable signalling system.

According to a further preferred embodiment of the present invention, the Interworking Function (IWF) provides an Sh and/or an Si reference point using at least one out of a DIAMETER (successor to the Remote Authentication Dial In User Service (RADIUS) protocol) or a Mobile Application Part (MAP) protocol. It is thereby advantageously possible to reduce the modifications of existing systems and network nodes as much as possible.

According to still a further preferred embodiment of the present invention, the Interworking Function (IWF) is arranged such that, in view of a specific request from the signalling layer regarding a specific User Equipment, in case that the specific User Equipment is related or potentially related to a plurality of nodes serving as the Home Location Register and/or serving as the Home Subscriber Server (HSS), the specific request is multiplied by the Interworking Function (IWF) and sent to the plurality of nodes serving as the Home Location Register and/or serving as the Home Subscriber Server (HSS), respectively, and responses of the plurality of nodes serving as the Home Location Register and/or serving as the Home Subscriber Server (HSS) are consolidated and the specific request answered to the signalling layer by means of a feedback communication.

Thereby, it is advantageously possible to use the Interworking Function (IWF) to provide an answer (to the signalling layer) to the specific request more quickly, thereby enhancing the service level (to a user of the telecommunications network, due to the fact that the specific request is multiplied and processed by at least two nodes (serving, e.g., as a Home Location Register and as a Home Subscriber Server)). Additionally, it is advantageously possible according the preferred embodiment that a communication of the signalling layer (i.e. Intelligent Network (IN) or Advanced Intelligent Network (AIN)) with the Home Subscriber Server (HSS) (or node serving as a Home Subscriber Server (HSS))

is possible even in case that the User Equipment is attached to the Evolved Packet System (EPS).

In the context of the present invention, the wording "the specific User Equipment being related or potentially related to a plurality of nodes serving as the Home Location Register and/or serving as the Home Subscriber Server" corresponds to a situation of the telecommunications network (and the User Equipment) where the User Equipment is e.g. attached to the core network of the Evolved Packet System (EPS) and/or to the core network of the GSM/UMTS telecommunications network such that it is not known to the signalling layer from which Home Location Register (plurality of Home Location Registers) and/or in which Home Subscriber Server (or plurality of Home Subscriber Servers) the location information of the User Equipment can be retrieved.

In the context of the present invention, the wordings
"the specific request is multiplied by the Interworking Function (IWF) and sent to the plurality of nodes serving as the Home Location Register and/or serving as the Home Subscriber Server (HSS), respectively" and
"responses of the plurality of nodes serving as the Home Location Register and/or serving as the Home Subscriber Server (HSS) are consolidated and the specific request answered to the signalling layer by means of a feedback communication"
mean:

in case that only one Home Location Register and one Home Subscriber Server are related or potentially related to the specific User Equipment, the a.m. wordings mean that on reception of the specific request at the Interworking Function (IWF), the Interworking Function (IWF) sends copies of the specific request to both the one Home Location Register and the one Home Subscriber Server (HSS), receives respective responses (or only one successful response from one of the nodes or a plurality of successful responses from a plurality of the nodes), and provides a consolidated feedback to the signalling layer;

in case that a plurality of Home Location Registers (or nodes serving as Home Location Registers) and a plurality of Home Subscriber Servers (or nodes serving as Home Subscriber Servers) are related or potentially related to the specific User Equipment, the a.m. wordings mean that on reception of the specific request at the Interworking Function (IWF), the Interworking Function (IWF) sends copies of the specific request to all the nodes (or to a subset of the nodes) serving as Home Location Registers and Home Subscriber Servers, and receives respective responses (or only one successful response from one of the nodes or a plurality of successful responses from a plurality of the nodes), and provides a consolidated feedback to the signalling layer.
Of course, a combination of these situations, i.e. only one Home Location Register but a plurality of Home Subscriber Servers (or nodes serving as a Home Subscriber Server) or vice versa is also possible according to the present invention.

According to a further preferred embodiment of the present invention, the specific request is an ATI (Any Time Interrogation) request, preferably regarding the location of the User Equipment.

According to still a further preferred embodiment of the present invention, the Core Network comprises a Mobility Management Entity (MME), wherein the Mobility Management Entity (MME) comprises an interface for communication with the node serving as a Home Subscriber Server (HSS).

Furthermore according to the present invention, it is preferred that the Interworking Function (IWF) is integrated in the node serving as the Home Location Register (HLR) and/or in the node serving as the Home Subscriber Server (HSS). Thereby, an integrated architecture for network nodes is possible that can lead to cost savings and performance enhancements.

According to another preferred embodiment of the present invention, the signalling layer is configured to request data regarding a User Equipment (UE) by exchanging information with the Interworking Function (IWF), the data being preferably location data of the User Equipment (UE), such as the cell identity (cell ID) of the current radio cell serving the User Equipment (UE) and/or the location area code (LAC) of the UE's current location area. It is thereby advantageously possible to easily and quickly provide location information to the Intelligent Network (IN) or the signalling layer of the Core Network. Other examples of data regarding a User Equipment (UE) that are requested by the signalling layer include data regarding the state of activity of the User Equipment (UE) (e.g. whether the User Equipment (UE) is active or not).

The present invention also relates to a Method for data transmission in an Evolved Packet System (EPS), the Core Network comprising one or more node(s) serving as a Home Location Register (HLR) according to a GSM/UMTS mobile communication network standard, the Core Network further comprising one or more node(s) serving as a Home Subscriber Server (HSS) according to the Internet Protocol Multimedia Subsystem (IMS) standard, and the Core Network further comprising an Interworking Function (IWF) for the handling of messages exchanged between a signalling layer of the Core Network on the one hand and the node(s) serving as the Home Location Register (HLR) as well as the node(s) serving as the Home Subscriber Server (HSS) on the other hand, wherein the method comprises requesting data regarding a User Equipment (UE) by exchanging information with the Interworking Function (IWF), wherein the data regarding the User Equipment (UE) are transmitted via the interface between the signalling layer and the Interworking Function (IWF) by means of an Intelligent Network (IN) or an Advanced Intelligent Network (AIN), and wherein preferably the data are location data of the User Equipment (UE). In the context of the present invention, the wording "wherein the data regarding the User Equipment (UE) are transmitted via the interface between the signalling layer and the Interworking Function (IWF) by means of an Intelligent Network (IN) or an Advanced Intelligent Network (AIN)" means that the data regarding the User Equipment (UE) are transmitted between the signalling layer and the Interworking Function (IWF) by means of using an Intelligent Network (IN) or an Advanced Intelligent Network (AIN).

Furthermore, it is preferred that the Interworking Function (IWF) provides an Sh and/or an Si reference point using at least one out of a DIAMETER (successor to the Remote Authentication Dial In User Service (RADIUS) protocol) or a Mobile Application Part (MAP) protocol to the signalling layer in order to request the data.

It is furthermore preferred according to the present invention that in view of a specific request from the signalling layer regarding a specific User Equipment (UE), in case that the specific User Equipment is related or potentially related to a plurality of nodes serving as the Home Location Register and/or serving as the Home Subscriber Server (HSS), wherein the method comprises the steps of:

the Interworking Function (IWF) multiplying the specific request and sending the specific request to the plurality of nodes serving as the Home Location Register and/or serving as the Home Subscriber Server (HSS), respectively, and the Interworking Function (IWF) receiving responses of the plurality of nodes serving as the Home Location Register and/or serving as the Home Subscriber Server (HSS), consolidating the responses, and answering the specific request to the signalling layer by means of a feedback communication wherein the specific request is preferably an ATI (Any Time Interrogation) request, preferably regarding the location of the User Equipment.

Thereby, it is advantageously possible that by using the inventive method an answer to the specific request can be provided more quickly to the signalling layer (i.e. preferably the Intelligent Network (IN) or the Advanced Intelligent Network (AIN)), which enhances the service level (to a user of the telecommunications network, due to the fact that the specific request is multiplied and processed by at least two nodes (serving, e.g., as a Home Location Register and as a Home Subscriber Server)). Additionally, it is advantageously possible according the preferred embodiment that a communication of the signalling layer (i.e. Intelligent Network (IN) or Advanced Intelligent Network (AIN)) with the Home Subscriber Server (HSS) (or node serving as a Home Subscriber Server (HSS)) is possible even in case that the User Equipment is attached to the Evolved Packet System (EPS).

It is furthermore preferred according to the present invention that the specific request is an ATI (Any Time Interrogation) request, preferably regarding the location of the User Equipment.

The present invention also relates to a Node for providing an Interworking Function (IWF) for data transmission in a Core Network of an Evolved Universal Terrestrial Radio Access Network (eUTRAN), the Core Network comprising one or more node(s) serving as a Home Location Register (HLR) according to a GSM/UMTS mobile communication network standard, the Core Network further comprising one or more node(s) serving as a Home Subscriber Server (HSS) according to the 3GPP standards, the node providing the Interworking Function (IWF) being provided for the handling of messages exchanged between a signalling layer of the Core Network on the one hand and the node(s) serving as the Home Location Register (HLR) as well as the node(s) serving as the Home Subscriber Server (HSS) on the other hand, wherein the interface between the signalling layer and the node providing the Interworking Function (IWF) is an Intelligent Network (IN) or an Advanced Intelligent Network (AIN).

Furthermore, the present invention relates to one or more Node(s) serving as the Home Subscriber Server (HSS) according to the 3GPP standards for data transmission in a Core Network of an Evolved Packet System (EPS), the Core Network comprising one or more node(s) serving as a Home Location Register (HLR) according to a GSM/UMTS mobile communication network standard, and the Core Network further comprising an Interworking Function (IWF) for the handling of messages exchanged between a signalling layer of the Core Network on the one hand and the node(s) serving as the Home Location Register (HLR) as well as the node(s) serving as the Home Subscriber Server (HSS) on the other hand, wherein the interface between the signalling layer and the Interworking Function (IWF) is an Intelligent Network (IN) or an Advanced Intelligent Network (AIN).

Additionally, the present invention relates to a program comprising a computer readable program code for controlling an Interworking Function (IWF) for data transmission in a Core Network of an Evolved Packet System (EPS) according to the present invention.

Furthermore, the present invention relates to a program comprising a computer readable program code for controlling a Node for providing an Interworking Function (IWF) according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a Core Network 10 for data transmission in an Evolved Packet System (EPS) is schematically illustrated. The Core Network 10 comprises a transport plane (or layer) 20 or user plane (or layer) 20, a control plane (or layer) 30 or signalling plane or layer 30, and an application plane or layer 40. User Equipment (UE), such as a first mobile device 21 and a second mobile device 22 can be connected to the telecommunications network and use the services of the Core Network 10 for their communication needs.

Such a layered network structure is in agreement with the standard according to the 3GPP (Third Generation Partnership Project). This means that transport and bearer services are separated from the service layer, e.g. an Intelligent Network (IN) or an Internet Protocol Multimedia Subsystem (IMS) signalling network and session management services. Further services run on top of the Intelligent Network (IN) or Internet Protocol Multimedia Subsystem (IMS) signalling network, i.e. the signalling plane or layer 30.

Figure 2:
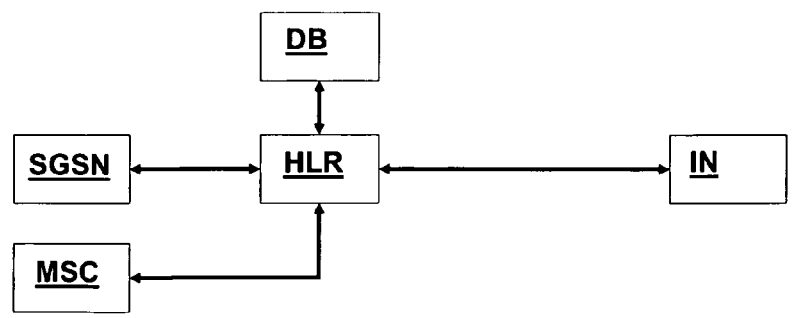
FIG. 2 schematically illustrates a part of a legacy Core Network comprising a Serving GPRS Support Node (SGSN), a Mobile Switching Center (MSC), a Home Location Register (HLR), a database associated to the Home Location Register (HLR), and an Intelligent Network (IN) system.
Figure 3:
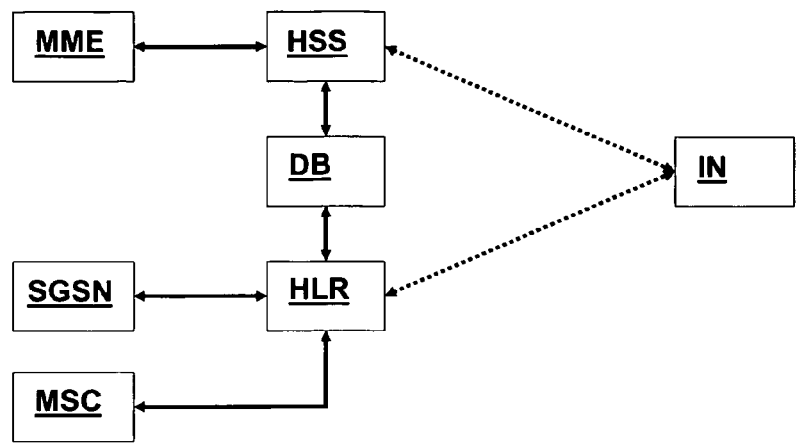
FIG. 3 schematically illustrates a part of a Core Network in an Evolved Packet System (EPS), the Core Network comprising a Home Subscriber Server (HSS) and a Mobility Management Entity (MME) besides a Serving GPRS Support Node (SGSN), a Mobile Switching Center (MSC), a Home Location Register (HLR), a database associated to the Home Location Register (HLR) and the Home Subscriber Server (HSS), and an Intelligent Network (IN) system, wherein the Intelligent Network (IN) system communicates both with the Home Subscriber Server (HSS) and the Home Location Register (HLR).

FIGS. 2 and 3 illustrate network configurations that are not part of the present invention.

In FIG. 2, a part of a legacy Core Network is schematically illustrated. The Core Network comprises a Serving GPRS Support Node (SGSN), a Mobile Switching Center (MSC), a Home Location Register (HLR), a database associated to the Home Location Register (HLR), and an Intelligent Network (IN) system. Such a legacy Core Network does not comprise a Mobility Management Entity (MME) or a Home Subscriber Server (HSS).

In FIG. 3, a part of a Core Network in an Evolved Packet System (EPS) is schematically illustrated. The Core Network comprising a Home Subscriber Server (HSS) and a Mobility Management Entity (MME) besides a Serving GPRS Support Node (SGSN), a Mobile Switching Center (MSC), a Home Location Register (HLR), a database associated to the Home Location Register (HLR) and the Home Subscriber Server (HSS), and an Intelligent Network (IN) system, wherein the Intelligent Network (IN) system communicates both with the Home Subscriber Server (HSS) and the Home Location Register (HLR).

The Home Subscriber Server (HSS) logically encompasses the legacy Home Location Register (HLR) and all other network related subscriber information, e.g. for the IMS. According to the prior art, there is no standard, or even common idea, how the Home Subscriber Server (HSS) is physically implemented—in some cases, existing Home Location Registers (HLRs) are upgraded, in others completely new nodes are deployed. In the "common data base approach" described above, the Home Location Register (HLR) frontend may be upgraded to include the Home Subscriber Server (HSS), or there may be a separate Home Subscriber Server (HSS) frontend.

Figure 4:
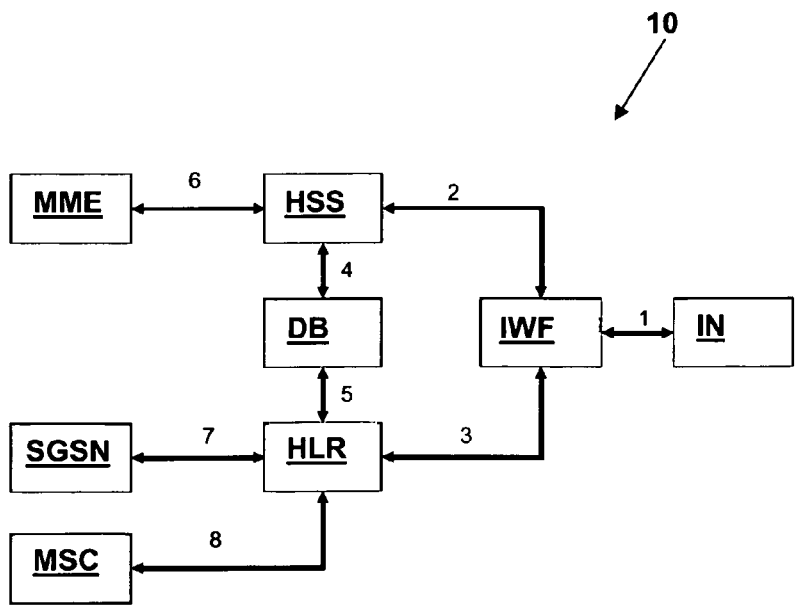
FIG. 4 schematically illustrates a part of a Core Network in an Evolved Packet System (EPS) according to the present invention, the Core Network comprising a Home Subscriber Server (HSS) and a Mobility Management Entity (MME) besides a Serving GPRS Support Node (SGSN), a Mobile Switching Center (MSC), a Home Location Register (HLR), a database associated to the Home Location Register (HLR) and the Home Subscriber Server (HSS), and an Intelligent Network (IN) system, wherein the Intelligent Network (IN) system communicates with an Interworking Function (IWF) between the Home Subscriber Server (HSS) and the Home Location Register (HLR) on the one hand and the Intelligent Network (IN) system on the other hand.

In FIG. 4, a part of a Core Network in an Evolved Packet System (EPS) according to the present invention is schematically illustrated. The Core Network comprises a Home Subscriber Server (HSS) and a Mobility Management Entity (MME) besides a Serving GPRS Support Node (SGSN), a Mobile Switching Center (MSC), a Home Location Register (HLR), a database associated to the Home Location Register (HLR) and the Home Subscriber Server (HSS), and an Intelligent Network (IN) system, wherein the Intelligent Network (IN) system communicates with an Interworking Function (IWF) between the Home Subscriber Server (HSS) and the Home Location Register (HLR) on the one hand and the Intelligent Network (IN) system on the other hand.

According to the present invention, such a Core Network 10 (or part of the Core Network 10) comprise a multitude of interfaces or reference points, namely a first reference point 1 between the Intelligent Network (IN) system and the Interworking Function (IWF), a second reference point 2 between the Interworking Function (IWF) and the Home Subscriber Server (HSS), a third reference point 3 between the Interworking Function (IWF) and the Home Location Register (HLR), a fourth reference point 4 between the Home Subscriber Server (HSS) and a database (DB) associated to the Home Subscriber Server (HSS), a fifth reference point 5 between the Home Location Register (HLR) on the one hand and the database (DB) (also associated to the Home Location Register (HLR)) (or another database (not explicitly shown) only associated to the Home Location Register (HLR)), a sixth reference point 6 between the Home Subscriber Server (HSS) and the Mobility Management Entity (MME), a seventh reference point 7 between the Home Location Register (HLR) and the Serving GPRS Support Node (SGSN), and an eighth reference point between the Home Location Register (HLR) and the Mobile Switching Center (MSC).

According to the embodiment shown in FIG. 4, the Interworking Function (IWF) may be a standalone function, i.e. a separate node provides the Interworking Function (IWF).

According to an alternative embodiment of the present invention, the Interworking Function (IWF) can be integrated in the Intelligent Network (IN) system hence the first reference point 1 is not needed.

Still according to an alternative embodiment of the present invention, the Interworking Function (IWF) can be integrated in the Home Location Register (HLR) (node serving as a Home Location Register (HLR)) or a Home Subscriber Server (HSS) (node serving as a Home Subscriber Server (HSS)).

According to the present invention, the interworking function (IWF) can either be an independent unit or separate unit or node (i.e. "node providing an Interworking Function (IWF)" or "Interworking Function (IWF) frontend") or can be part of an integrated unit (e.g. integrated into a unit or node serving as a Home Location Register (HLR) and/or a Home Subscriber Server (HSS)) that provides the functionality in the Core Network 10 to provide for a protocol conversion between the Intelligent Network (IN) system (as part of a signalling layer 30) on the one hand and (Home Location Register (HLR)/Home Subscriber Server (HSS) related) databases and frontends on the other hand.

Furthermore, the Interworking Function (IWF) creates multiple requests towards the databases DB or frontends from existing Intelligent Network (IN) system actions (i.e. in case the Intelligent Network (IN) requests a specific User Equipment (UE) related information or data and more than one frontend/database could be involved for retrieving such information or data, then the Interworking Function (IWF), sends requests to such frontends/databases and, in the feedback communication to the Intelligent Network (IN), consolidates the results obtained).

The invention claimed is:

1. A Core Network for data transmission in an Evolved Packet System (EPS), the Core Network comprising:
   one or more node(s) serving as a Home Location Register (HLR) according to a GSM/UMTS mobile communication network standard;
   a node serving as a Home Subscriber Server (HSS) according to 3GPP standards; and
   an Interworking Function (IWF) for the handling of messages exchanged between a signalling layer of the Core Network and the one or more node(s) serving as the Home Location Register (HLR) as well as the node serving as the Home Subscriber Server (HSS);
   wherein the Core Network is arranged such that for an exchange of information between the signalling layer and the Interworking Function (IWF), an Intelligent Network (IN) or an Advanced Intelligent Network (AIN) is used;
   wherein the Interworking Function (IWF) is arranged such that, in view of a specific request from the signalling layer regarding a specific User Equipment (UE), wherein the specific User Equipment (UE) is related or potentially related to a plurality of nodes serving as at least one of the Home Location Register or the Home Subscriber Server (HSS), the specific request is multiplied by the Interworking Function (IWF) and sent to the plurality of nodes serving as at least one of the Home Location Register or the Home Subscriber Server (HSS); and
   wherein responses of the plurality of nodes serving as at least one of the Home Location Register or the Home Subscriber Server (HSS) are consolidated and the specific request answered to the signalling layer by a feedback communication.

2. The Core Network according to claim 1, wherein the specific request is an ATI (Any Time Interrogation request).

3. The Core Network according to claim 2, wherein the ATI (Any Time Interrogation) request is regarding the location of the User Equipment (UE).

4. The Core Network according to claim 1, wherein the signalling layer is a Signalling System #7 (SS7) protocol.

5. The Core Network according to claim 1, wherein the Interworking Function (IWF) provides at least one of an Sh or an Si reference point using at least one out of a DIAMETER or a Mobile Application Part (MAP) protocol.

6. The Core Network according to claim 1, wherein the Interworking Function (IWF) is integrated in at least one of the one or more node(s) serving as the Home Location Register (HLR), the node serving as the Home Subscriber Server (HSS), or a separate node providing the Interworking Function (IWF).

7. The Core Network according to claim 1, wherein the one or more node(s) serving as the Home Location Register (HLR) is a Home Location Register (HLR) frontend.

8. The Core Network according to claim 1, wherein the node serving as the Home Subscriber Server (HSS) is a Home Subscriber Server (HSS) frontend.

9. The Core Network according to claim 1, wherein the signalling layer is configured to request data regarding a User Equipment (UE) by exchanging information with the Interworking Function (IWF).

10. The Core Network according to claim 9, wherein the data is location data of the User Equipment (UE).

11. A method for data transmission in an Evolved Packet System (EPS), the method comprising:
   requesting data regarding a User Equipment (UE) by exchanging information with the Interworking Function (IWF) of a Core Network, wherein the data regarding the User Equipment (UE) is transmitted between a signalling layer in the Core Network and the Interworking Function (IWF) by an Intelligent Network (IN) or an Advanced Intelligent Network (AIN);
   multiplying, by the Interworking Function (IWF), a specific request from the signalling layer regarding a specific User Equipment (UE), wherein the specific User Equipment (UE) is related or potentially related to a plurality of nodes serving as at least one of the Home Location Register or the Home Subscriber Server (HSS);
   receiving, by the Interworking Function (IWF), responses from the plurality of nodes serving as at least one of the Home Location Register or the Home Subscriber Server (HSS);
   consolidating the responses; and
   answering the specific request to the signalling layer by a feedback communication.

12. The method according to claim 11, wherein the data is location data of the User Equipment (UE).

13. The method according to claim 11, wherein the signalling layer is a Signalling System #7 (SS7) protocol.

14. The method according to claim 11, wherein the Interworking Function (IWF) provides at least one of an Sh or an Si reference point using at least one out of a DIAMETER or a Mobile Application Part (MAP) protocol to the signalling layer in order to request the data.

15. The method according to claim 11, wherein the specific request is an ATI (Any Time Interrogation) request.

16. The method according to claim 15, wherein the ATI (Any Time Interrogation) request is regarding the location of the User Equipment (UE).

17. A node for providing an Interworking Function (IWF) for data transmission in a Core Network of an Evolved Packet System (EPS), the node having a non-transitory computer-readable medium with processor-executable instructions stored thereon, the processor-executable instructions, when executed by a processor, causing the following steps to be performed:
   receiving a specific request for data regarding a User Equipment (UE) from an Intelligent Network (IN) or an Advanced Intelligent Network (AIN), wherein the specific User Equipment (UE) is related or potentially related to a plurality of nodes serving as at least one of the Home Location Register or the Home Subscriber Server (HSS);
   multiplying the specific request for the plurality of nodes;
   receiving responses from the plurality of nodes serving as at least one of the Home Location Register or the Home Subscriber Server (HSS);
   consolidating the responses; and
   answering the specific request to the signalling layer by a feedback communication.

18. The node according to claim 17, wherein the specific request is an ATI (Any Time Interrogation) request.

19. The node according to claim 18, wherein the ATI (Any Time Interrogation) request is regarding the location of the User Equipment (UE).

* * * * *